(12) United States Patent
Cohen et al.

(10) Patent No.: US 12,154,868 B2
(45) Date of Patent: Nov. 26, 2024

(54) INTEGRATED CIRCUIT SECURITY USING PROGRAMMABLE SWITCHES

(71) Applicant: International Business Machines Corporation, Armonk, NY (US)

(72) Inventors: Guy M. Cohen, Ossining, NY (US); Effendi Leobandung, Stormville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 421 days.

(21) Appl. No.: 17/114,706

(22) Filed: Dec. 8, 2020

(65) Prior Publication Data

US 2022/0181275 A1   Jun. 9, 2022

(51) Int. Cl.
| | | |
|---|---|---|
| H01L 23/00 | (2006.01) | |
| G06F 21/76 | (2013.01) | |
| H03K 19/173 | (2006.01) | |
| H10N 70/00 | (2023.01) | |
| H10N 70/20 | (2023.01) | |

(52) U.S. Cl.
CPC ............ *H01L 23/576* (2013.01); *G06F 21/76* (2013.01); *H03K 19/1733* (2013.01); *H10N 70/011* (2023.02); *H10N 70/231* (2023.02); *H10N 70/826* (2023.02); *H10N 70/841* (2023.02); *H10N 70/861* (2023.02)

(58) Field of Classification Search
CPC ... H01L 23/576; H01L 23/5252; G06F 21/75; G06F 21/76; H03K 19/1733; H10N 70/011; H10N 70/231; H10N 70/826; H10N 70/841; H10N 70/861; H10N 70/066; H10N 70/8613; G11C 2013/008; G11C 13/0004; G11C 13/004; G11C 13/0069

See application file for complete search history.

(56) References Cited

U.S. PATENT DOCUMENTS

| | | | |
|---|---|---|---|
| 6,836,433 B2 | 12/2004 | Kondo | |
| 7,477,545 B2* | 1/2009 | Tu | ............... G11C 29/88 365/185.05 |
| 7,633,079 B2* | 12/2009 | Chen | ............... H01L 23/5256 438/102 |
| 7,930,664 B2 | 4/2011 | Feng | |
| 7,941,769 B1* | 5/2011 | Hu | ............... G06F 21/76 716/101 |
| 9,059,679 B2 | 6/2015 | Edelstein | |
| 9,461,649 B2 | 10/2016 | Cong | |

(Continued)

OTHER PUBLICATIONS

"Integrated Circuit Security Using Programmable Switches", PCT Application No. PCT/EP2021/082178, filed on Nov. 18, 2021, 25 pages.

(Continued)

*Primary Examiner* — Seokjin Kim
(74) *Attorney, Agent, or Firm* — Daniel Morris; Andrew D. Wright; Calderon Safran & Wright P.C.

(57) ABSTRACT

A security key associated with a plurality of programmable switches included in an integrated circuit is received. The plurality of programmable switches are set causing the plurality of programmable switches to be conductive. Reset pulses are applied to a first set of programmable switches included in the plurality of programmable switches based on the received security key.

20 Claims, 9 Drawing Sheets

(56) References Cited

U.S. PATENT DOCUMENTS

| | | | |
|---|---|---|---|
| 9,792,461 B2* | 10/2017 | Isono | G06F 21/76 |
| 2003/0185048 A1* | 10/2003 | Fricke | H01L 21/8221 |
| | | | 365/170 |
| 2007/0155093 A1* | 7/2007 | Jeong | G11C 13/0004 |
| | | | 438/257 |
| 2009/0033360 A1 | 2/2009 | Chen | |
| 2009/0127537 A1* | 5/2009 | Jedema | H10N 70/826 |
| | | | 257/E47.001 |
| 2010/0163833 A1 | 7/2010 | Borghi | |
| 2010/0165726 A1* | 7/2010 | Shepard | G11C 13/0004 |
| | | | 365/163 |
| 2010/0238720 A1* | 9/2010 | Tio Castro | H10N 70/8613 |
| | | | 365/163 |
| 2011/0069528 A1* | 3/2011 | Gammel | G11C 13/0069 |
| | | | 326/8 |
| 2011/0102016 A1* | 5/2011 | Chen | H10N 70/253 |
| | | | 326/38 |
| 2011/0254589 A1* | 10/2011 | Gammel | H03K 19/20 |
| | | | 326/51 |
| 2012/0243307 A1* | 9/2012 | Takashima | H10N 70/231 |
| | | | 257/E27.081 |
| 2012/0314491 A1* | 12/2012 | Thiruvengadam | |
| | | | G11C 13/0004 |
| | | | 365/163 |
| 2013/0258766 A1* | 10/2013 | Conte | G11C 13/004 |
| | | | 365/163 |
| 2014/0103286 A1* | 4/2014 | Chu | H10B 63/30 |
| | | | 438/60 |
| 2016/0028007 A1* | 1/2016 | Borodulin | H10N 70/8413 |
| | | | 257/4 |
| 2016/0056373 A1* | 2/2016 | Goktepeli | H10B 63/22 |
| | | | 257/2 |
| 2017/0229173 A1* | 8/2017 | BrightSky | G11C 13/0059 |
| 2017/0365427 A1* | 12/2017 | Borodulin | H10N 70/8613 |
| 2019/0088721 A1* | 3/2019 | Reig | H01P 1/10 |
| 2019/0097128 A1* | 3/2019 | Jonnalagadda | H10N 70/821 |
| 2019/0355673 A1* | 11/2019 | Sarafianos | H01L 23/528 |
| 2020/0242248 A1* | 7/2020 | Leger | G06F 21/76 |
| 2021/0249592 A1* | 8/2021 | Wu | G11C 13/0035 |
| 2021/0249600 A1* | 8/2021 | Chien | H10N 70/231 |
| 2021/0288250 A1* | 9/2021 | Li | G11C 13/0004 |
| 2021/0375360 A1* | 12/2021 | Gong | G11C 11/5678 |
| 2021/0391006 A1* | 12/2021 | Futase | H10N 70/063 |
| 2021/0407592 A1* | 12/2021 | Sforzin | G11C 13/0026 |
| 2022/0149114 A1* | 5/2022 | Yang | H01L 29/24 |
| 2022/0406997 A1* | 12/2022 | Adamski | H10N 70/231 |
| 2023/0021991 A1* | 1/2023 | Heiss | H03K 17/80 |
| 2023/0207008 A1* | 6/2023 | Miscuglio | G11C 13/004 |
| | | | 365/163 |

OTHER PUBLICATIONS

Knechtel et al., "Protect Your Chip Design Intellectual Property: An Overview", arXiv:1902.05333v3 [cs.CR] Feb. 24, 2019, 6 pages.

Patent Cooperation Treaty, PCT, Notification of Transmittal of the International Search Report and the Written Opinion of the International Searching Authority, or the Declaration, Date of mailing Feb. 9, 2022, Applicants or agents file reference P201903107, International application No. PCT/EP2021/082178, International filing date Nov. 18, 2021, 12 pages.

Colombier et al., "Microprocessors & Microsystems", Elsevier, vol. 47 pp. 44-54, Nov. 2016, 12 pages.

Colombier, Brice, "Methods for protecting intellectual property of IP cores designers" Université de Lyon, 2017, Submitted on Apr. 24, 2019, 209 pages.

Chen et al., "Hardware Protection via Logic Locking Test Points", IEEE Transactions on Computer-Aided Design of Integrated Circuits and Systems, vol. 37, Issue: 12 , Dec. 2018, 11 pages.

Valamehr et al., "A 3D Split Manufacturing Approach to Trustworthy System Development", Calhoun, Dec. 1, 2012, 41 pages, <http://hdl.handle.net/10945/37460>.

* cited by examiner

INTEGRATED CIRCUIT SECURITY USING PROGRAMMABLE SWITCHES

BACKGROUND

The present invention relates generally to the field of integrated circuits (i.e., computer chips, or simply chips), and more particularly to providing a security mechanism for computer chips using programmable switches.

Computer chips have revolutionized the world. These chips are found in many consumer products—from your robotic vacuum cleaner indoors to your robotic lawnmower outdoors. Improvements in the manufacturing of chips have led to the progression from the first handheld calculator, a device capable of performing only basic mathematical functions, to today's modern smartphones, a computer that can be held in, and operated by, one hand. Sales of computer chips are expected to top four hundred billion dollars this year worldwide. With a market that lucrative, companies need a way to protect their chip designs from being copied by competitors.

SUMMARY OF THE INVENTION

Embodiments of the present invention include a method for providing a security mechanism for computer chips using programmable switches. In one embodiment, a security key associated with a plurality of programmable switches included in an integrated circuit is received. The plurality of programmable switches are set causing the plurality of programmable switches to be conductive. Reset pulses are applied to a first set of programmable switches included in the plurality of programmable switches based on the received security key.

DETAILED DESCRIPTION

Embodiments of the present invention recognize that many companies worldwide manufacture computer chips. In some instances, companies produce their own chips; in other instances, a first company may subcontract a second company to manufacture, or electrically test, their chips. Today, the intellectual property included in the chip can be protected by using the logic lock method. Here, additional logic circuits are inserted in-between existing, functional logic circuits. The input to these additional logic circuits are treated as a key; without this key, the chip will not function as intended. There are several disadvantages to the logic lock—(i) valuable chip real estate is taken by the additional logic circuits; (ii) the additional logic consumes power; and (iii) the additional logic may lead to delays in the operation of the functional circuit. A protection method is needed that can protect the chip and overcome these disadvantages.

Embodiments of the present invention recognize that there is an approach for providing a security mechanism for computer chips using programmable switches (PS). In an embodiment, any number of PS are inserted into the standard, functional circuitry of a chip. The PS is comprised of a phase change material (PCM). In the crystalline state, the PCM is highly conductive and the PS is considered to be 'closed'. In the amorphous state, the PCM is highly resistive (i.e., low conductance) and the PS is considered to be 'open'. The state of the PCM can be controlled by proximity heaters, which are produced as part of the PS. By requiring some number of PS to be 'closed' and some other number of PS to be 'open' for the chip to function properly, a security key can be designed into the chip that does not require extra real estate, does not require constant power, and does not affect the performance of the chip. The utilization of this security key improves the technology of integrated circuits (i.e., computer chips) by providing a simple protection mechanism which prevents intellectual property from being stolen.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "right", "left", "vertical", "horizontal", "top", "bottom", "above", "below", and derivatives thereof shall relate to the disclosed structures and methods, as oriented in the drawing Figures. The terms "overlaying", "atop", "positioned on", or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

As referred to herein, certain elements referred to as singular can also be considered to be plural. In the following examples, the term "X" refers to both a single "X" and two or more of "X": "programmable switch", "PS", "layer", and "via".

The present invention will now be described in detail with reference to the Figures.

Figure 1:
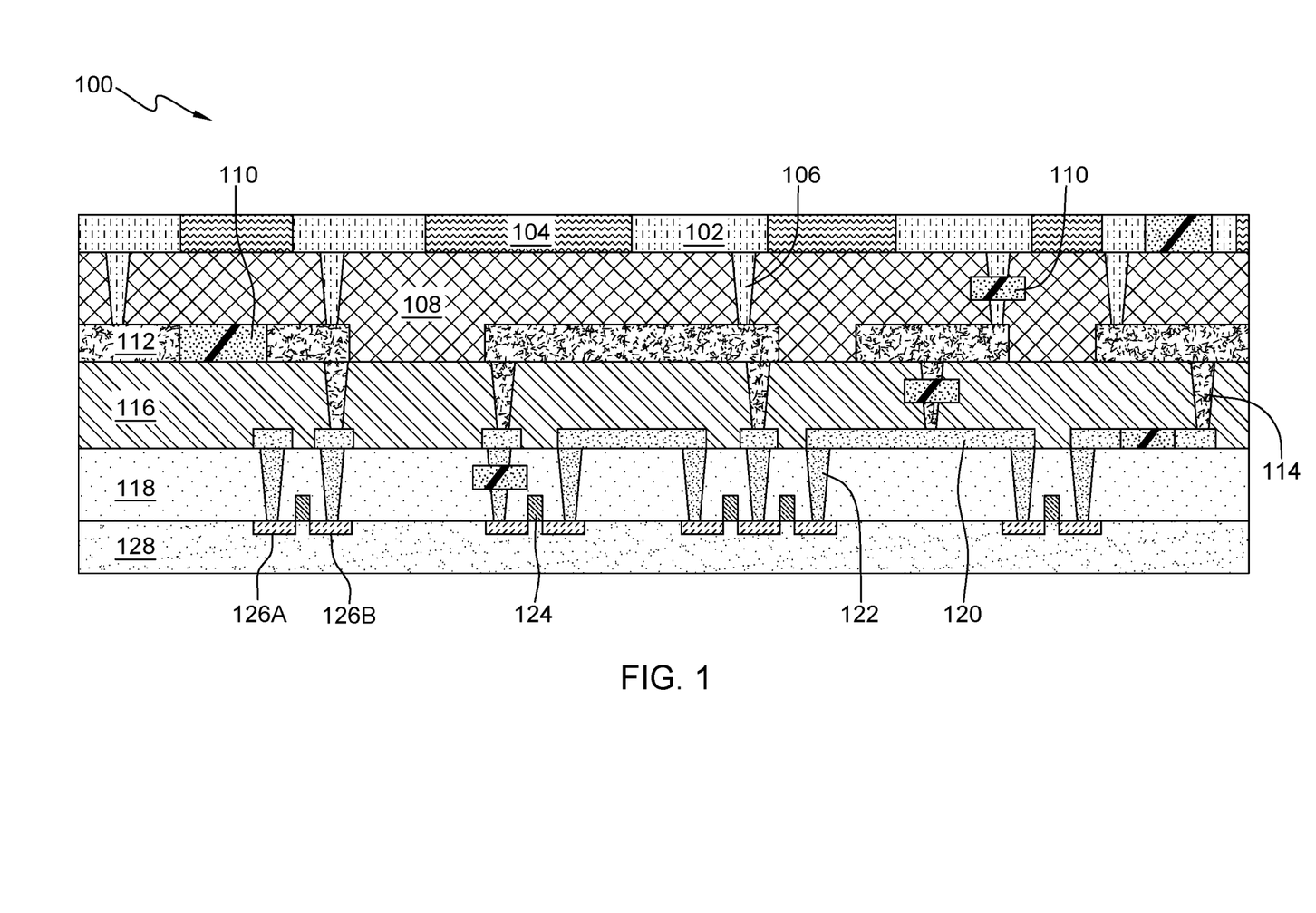
FIG. 1 depicts a cross-section of a computer chip showing possible locations of programmable switches (PS), in accordance with an embodiment of the present invention.

FIG. 1 is an example cross-section of a complementary metal-oxide semiconductor (CMOS) computer chip, generally designated 100, in accordance with one embodiment of the present invention. FIG. 1 provides only an illustration of one implementation and does not imply any limitations with regard to the different embodiments that may be implemented. Many modifications to the depicted embodiment may be made by those skilled in the art without departing from the scope of the invention as recited by the claims.

In general, a CMOS chip is generally manufactured in two portions: a front-end-of-line (FEOL) and a back-end-of-line (BEOL). Generally, in the FEOL processing, the individual devices (e.g., transistors, capacitors, resistors, etc.) are patterned on the silicon base. The BEOL processing comprises the formation of the metal interconnect layers of the chip. BEOL includes contacts, insulating layers, metal levels, and bonding sites for chip-to-package connections. The PS of the present invention is manufactured in the BEOL.

In an embodiment, cross-section 100 includes M3 metal 102 (where M3 refers to layer 4 of the chip), dielectric 104, M3/M2 via 106, dielectric 108, programmable switch (PS) 110, M2 metal 112, M2/M1 via 114, dielectric 116, dielectric 118, M1 metal 120, M1/FET via 122 (where a FET is a field effect transistor), FET gate 124, FET source 126A, FET drain 126B, and silicon 128. The combination of FET source 126A, FET gate 124, and FET drain 126 comprise a FET. In an embodiment, other than PS 110, the balance of structure comprising cross-section 100 are included in computer chips manufactured today.

In the embodiment, FET gate 124 is disposed atop the base layer comprised of silicon 128. FET source 126A and FET drain 126B are doped region in silicon 128 and are adjacent to FET gate 124. Dielectric 118 is deposited on top of the silicon and the FET. Holes (i.e., vias) are created in dielectric 118 and are filled with tungsten or other suitable materials creating M1/FET via 122 (i.e., the interconnect between M1 metal 120 and one of FET source 126A and FET drain 126B). Chemical mechanical planarization (CMP) is used to remove the excess of M1/FET via 122 over dielectric 118. Dielectric 116 is deposited over the device and patterned to form trenches into which M1 metal 120 is deposited to create the overall first layer of circuitry. CMP is then used to remove the excess of M1 metal 120 over dielectric 116. This process is repeated for the remaining metal layers of the structure. Discussion of how PS 110 is manufactured can be found later in this document in the discussion of FIGS. 7A through 7D.

M3 metal 102, M2 metal 112, and M1 metal 120 are generally comprised of one of copper and aluminum. M3/M2 via 106, M2/M1 via 114, and M1/source via 122 are holes in dielectric 108, dielectric 116, and dielectric 118, respectively, which are filled with tungsten to provide electrical connectivity between layers. Dielectric 108, dielectric 116, and dielectric 118 are materials which provide electrical isolation between portions of the structure. Silicon dioxide ($SiO_2$) or any material with a low dielectric constant is generally used as a dielectric material in chip manufacturing. FET source 126A, FET gate 124, and FET drain 126B are the three terminals that comprise a FET device, which is a transistor that uses electric field to control the flow of current in the channel connecting FET source 126A and FET drain 126B. A FET is generally comprised of a silicon-based channel, bot other materials may be used such as silicon germanium alloys and group III-V semiconductors.

Figure 2:
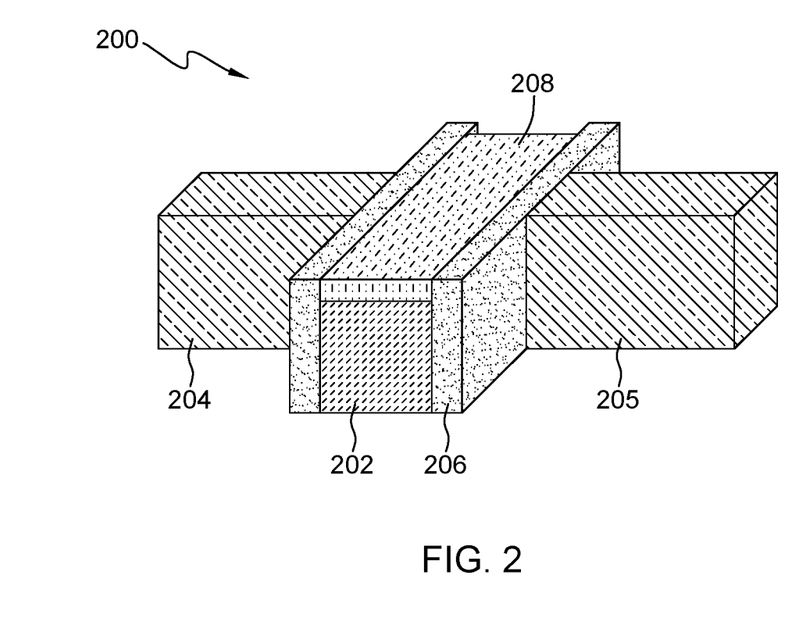
FIG. 2 depicts a three-dimensional (3D) structure of a PS, in accordance with an embodiment of the present invention.

FIG. 2 depicts a 3D structure of a PS, generally designated 200, in accordance with an embodiment of the present invention. FIG. 2 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, PS 200 includes phase change material (PCM) 202, heater 204, heater 205, spacer sidewall 206, and hard mask 208. PCM 202 can be in one or two states: crystalline and amorphous. In the crystalline state, PCM 202 is conductive. In the amorphous state, PCM 202 is non-conductive. Examples of PCM 202 include, but are not limited to, germanium antimony telluride ($Ge_2Sb_2Te_5$), germanium telluride (GeTe), antimony telluride ($Sb_2Te_3$), GaSb (gallium antimony), and many others. In this embodiment, germanium telluride is used for PCM 202. Heater 204 and heater 205 are resistive heaters (i.e., devices that give off heat when current flows through them). For example, heater 204 and heater 205 can be comprised of tantalum nitride (TaN). Heater 204 and heater 205 oppose one another on opposite sides of PCM 202 as shown in FIG. 2. Generally, the plane that contains heater 204 and heater 205 is orthogonal to the primary plane of PCM 202. Heater 204 and heater 205 are electrically isolated from PCM 202 and thermally coupled to PCM 202 by spacer sidewall 206. Thus, spacer sidewall 206 is both an electrical insulator and a thermal conductor. Examples of spacer sidewall 206 include, but are not limited to, aluminum nitride (AlN) and hexagonal-boron nitride (hex-BN). In this embodiment, aluminum nitride is used for spacer sidewall 206. Hard mask 208 is used to define (i.e., etch) PCM 202 during the manufacturing process. Hard mask 208 also serves as a "stop layer" during the chemical-mechanical planarization (CMP) process which is done so that the tops of heater 204, heater 205, spacer sidewall 206, and hard mask 208 are all generally at the same level (i.e., on the same plane).

Figure 3:
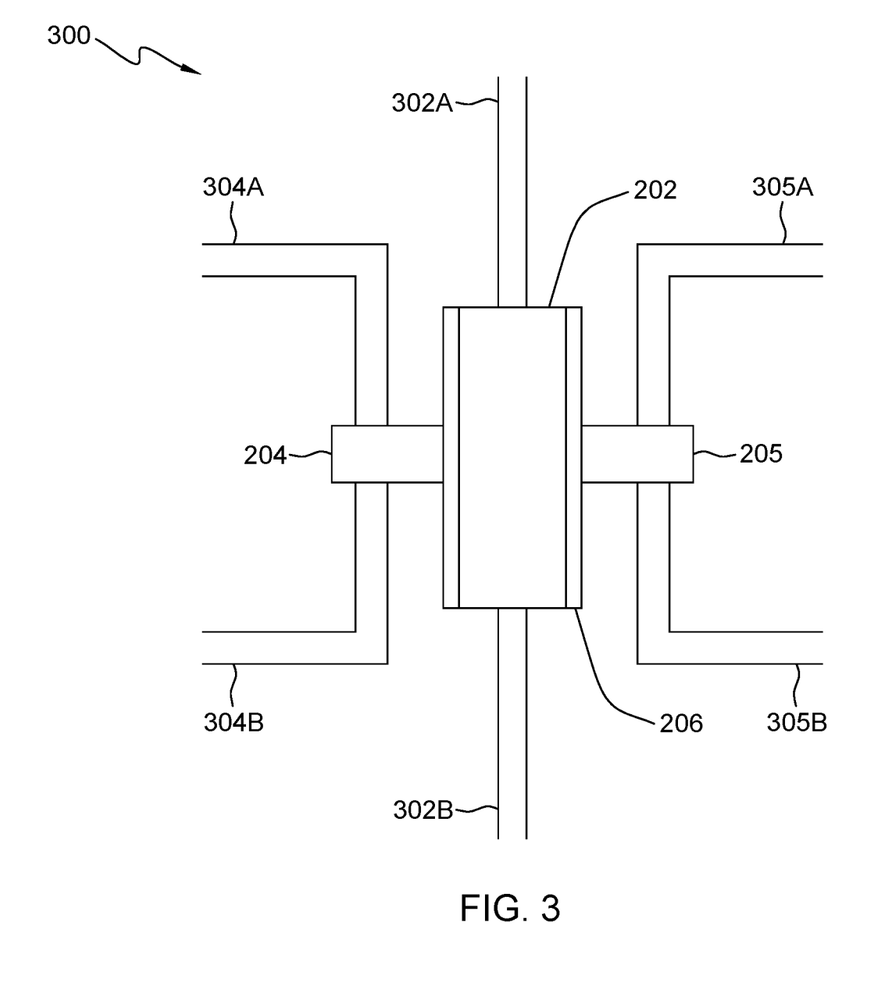
FIG. 3 depicts a top view of a PS, associated circuitry, and chip circuitry, in accordance with an embodiment of the present invention.

FIG. 3 depicts a top view of a PS generally designated 300, in accordance with an embodiment of the present invention. FIG. 3 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, PS 300 includes previously described PCM 202, heater 204, heater 205, and spacer sidewall 206. Also included in PS 300 are the following new features—PS input 302A, PS output 302B (which are two electrodes separated by PCM 202), heater 204 input 304A, heater output, 304B, heater 205 input 305A, and heater 205 output 305B. PS input 302A, PS output 302B, heater 204 input 304A, heater output, 304B, heater 205 input 305A, and heater 205 output 305B are wiring (i.e., electrode) inputs which carry electrical current. Note that there is no inherent directionality to the input and output current flows; however, in this embodiment, current flows to heater 204 along heater 204 input 304A and flows out of heater 204 along heater output 304B. Similarly, in the embodiment, current flows to heater 205 along heater 205 input 305A and flows out of heater 205 along heater output 305B. The conductivity of PS 202 (i.e., the opening or closing of the switch), thus controlling the current flowing through PS 202 is controlled by how heater 204 and heater 205 are heated and/or cooled. PS input 302A and PS output 302B are part of the functional circuitry of the chip. Heater 204 input 304A, heater 204 output 304B, heater 205 input 305A, and heater 205 output 305B are circuits that are dedicated to heater 204 and heater 205; these circuits are independent of the functional circuitry of the device. PS input 302A and PS output 302B can be any of M1 metal 120, M2 metal 112, M3 metal 102, M1/FET via 122, M2/M1 via 114, and M3/M2 via 106 of FIG. 1.

Figure 4:
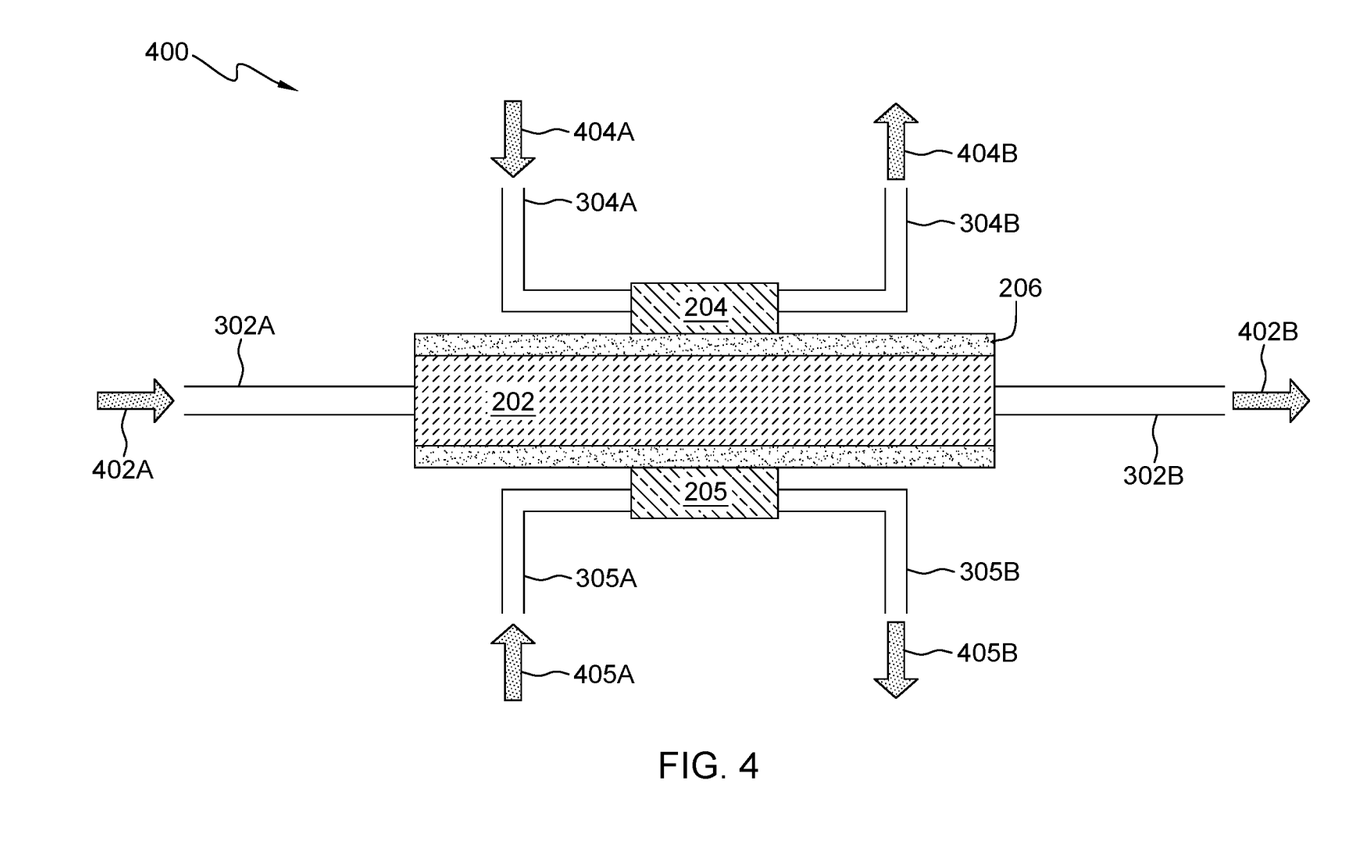
FIG. 4 depicts a top view of a PS and current flow in various circuitry, in accordance with an embodiment of the present invention.

FIG. 4 depicts a PS generally designated 400, which is a depiction of the top view of the FIG. 3 PS 300 with electrical current flow of the PS and electrical current flow of the functional circuitry including PS 300, in accordance with an embodiment of the present invention. FIG. 4 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, as indicated by current flow 402A, electrical current is carried along PS input 302A to PS 300, the current flows through PCM 202 (i.e., part of PS 300), and the current flows out of PCM 202 along PS output 302B (as indicated by current flow 402B). Current flow 402A and current flow 402B are part of the operational current of the computer chip. Here, when PS 300 is "closed", current can pass through the programmable switch, as indicated by current flow 402A and current flow 402B. When PS 300 is "open", no current flows through either of current flow 402A or current flow 402B. As indicated by current flow 404A, electrical current is carried along heater 204 input 304A to heater 204 (which causes heater 204 to give off heat to PCM 202) and the current out of heater 204 flows along heater 204 output 304B (as indicated by current flow 404B). As indicated by current flow 405A, electrical current is carried along heater 205 input 305A to heater 205 (which causes heater 205 to give off heat to PCM 202) and the current out of heater 205 flows along heater 205 output 305B (as indicated by current flow 405B).

In the embodiment, when PCM 202 is initially in a crystalline state, and current flow 404A and current flow 405A are reset pulses, crystalline regions in PCM 202 will change state and become amorphous. The reset pulse is a current flow (i.e., pulse) that causes the PCM temperature to rise above the melting temperature followed by a quenching (i.e., fast reduction of the current that leads to fast cooling) of the PCM. Said fast cooling does not allow the PCM sufficient time to crystallize leading to an amorphous region. This process is also known as "melt-quench". If PCM 202 is initially in an amorphous state and current flow 404A and current flow 405A are set pulses, amorphous regions in PCM 202 will change state and become crystalline. The set pulse is a current flow that causes the PCM temperature to increase above the crystallization temperature of the PCM followed by a slow lowering of the PCM temperature; this set process causes the PCM to change from an amorphous state to a crystalline state. As an example, for $Ge_2Sb_2Te_5$ (a germanium antimony tellurium alloy) the crystallization temperature is approximately 160 degrees Celsius (C), and the melting temperature is about 600 degrees C. As another example, the meting temperatures of antimony telluride ($Sb_2Te_3$) and germanium telluride (GeTe), are approximately 620 degrees C. and 725 degrees C., respectively.

Figure 5A:
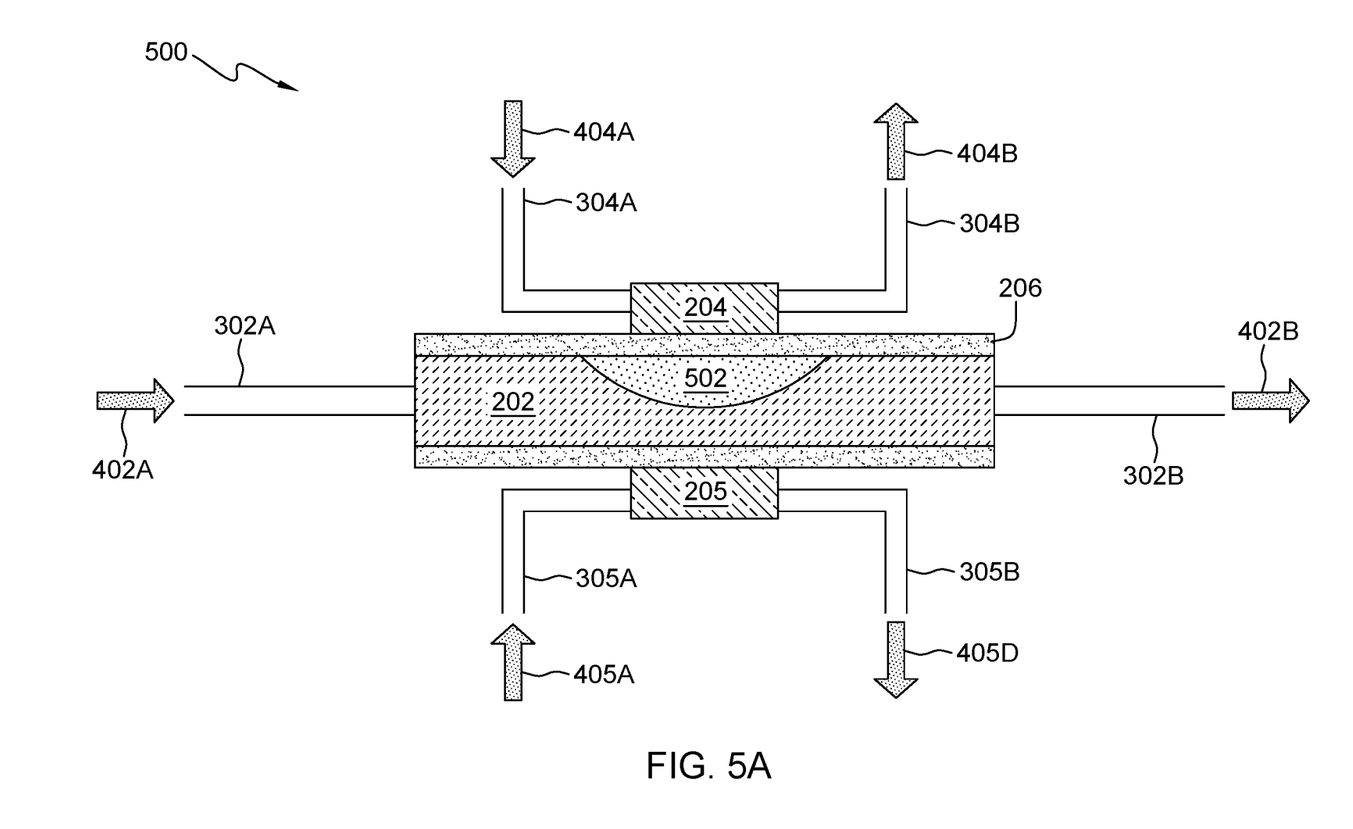
FIG. 5A depicts a top view of a PS, current flow in various circuitry, and the formation of an amorphous region, in accordance with an embodiment of the present invention.

FIG. 5A depicts a PS generally designated 500, which depicts PS 300 of FIG. 3, associated circuitry, and the current flow of FIG. 4, and an amorphous region of the PCM, in accordance with an embodiment of the present invention. FIG. 5A provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, as current flow 404A (a reset current pulse) flows through heater 204 (i.e., current flows in along heater 204 input 304A and flows out along heater 204 output 304B), heater 204 gives off a heat pulse causing the structure of PCM 202 to begin to form into amorphous region 502 adjacent to heater 204. Thus, as heater 204 heats (caused by current flow 404A), amorphous region 502, in proximity to heater 204, forms in PCM 202. Because amorphous region 502 in PCM 202 does not extend throughout the full width of PCM 202, current flow 402A can still flow through PCM 202 (i.e., a portion of PCM 202 remains crystalline and therefore, highly conductive and the PS remains "closed").

Figure 5B:
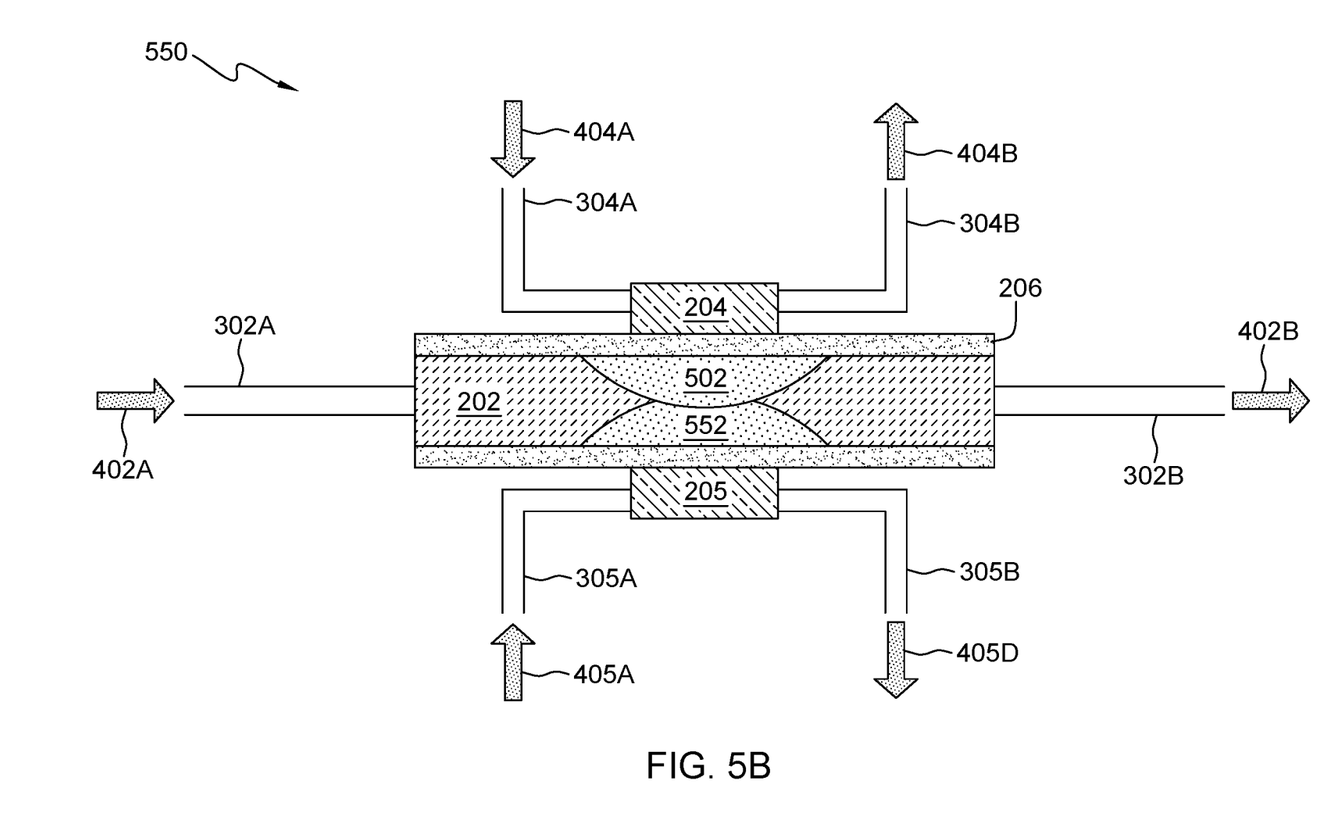
FIG. 5B depicts a top view of a PS, current flow in various circuitry, and the formation of multiple amorphous regions, in accordance with an embodiment of the present invention.

FIG. 5B depicts a PS, generally designated 550, which depicts PS 500 of FIG. 5A, and a second amorphous region, in accordance with an embodiment of the present invention. FIG. 5A provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, amorphous region 502 is created as described above. In a like manner, current flow 405A (also a reset current pulse) flows through heater 205 (i.e., current flows in along heater 205 input 305A and flows out along heater 205 output 305B) causing heater 205 to give off a heat pulse resulting in the formation of amorphous region 552 in PCM 202. Here, because amorphous region 502 and amorphous region 552 merge, no current path through a crystalline portion of PCM 202 is available the PS is now "open".

Thus, by utilizing set and reset pulses with the appropriate programmable switches, each PS can be "closed" or "open" individually per the security key. When the security key is followed, the chip is fully functional. If the security is not exactly followed, the chip is not functional.

Figure 6:
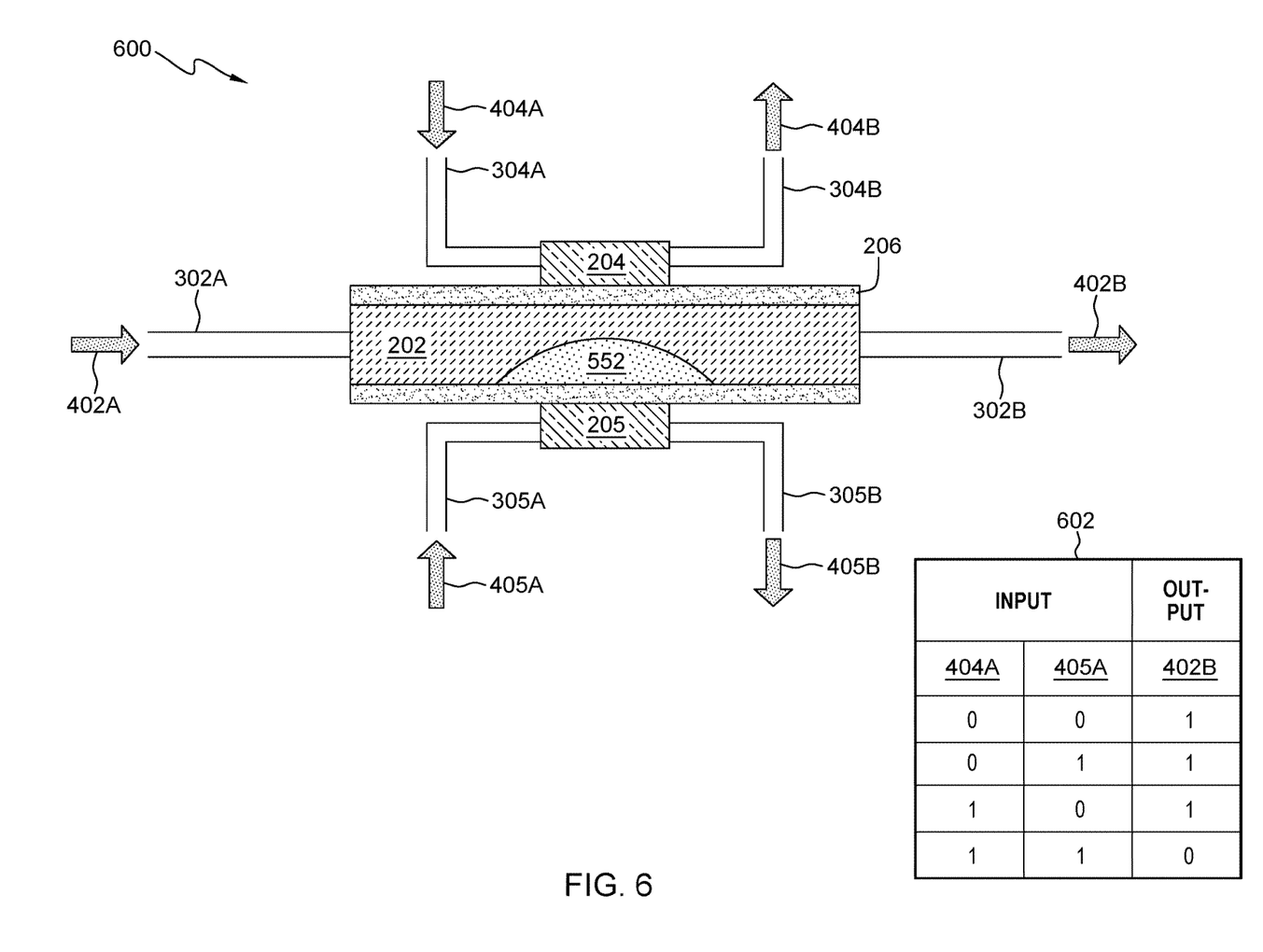
FIG. 6 depicts FIG. 5A and an associated logic table, in accordance with an embodiment of the present invention.

FIG. 6 depicts a PS generally designated 600, which is the PS 400 of FIG. 4 with a single amorphous region 552. PS 600 will be used in the discussion of how a PS can function as a logic device that implements a NAND truth table 602 which is included in FIG. 6.

In an embodiment, the initial state of PCM 202 is crystalline and thus, conductive. When no current flows through heater 204 and heater 204 (i.e., current flow 404A and current flow 405A are both zero), PCM 202 remains fully crystalline PS 600 remains conductive. This is shown in NAND truth table 602 where "input" 404A and "input" 405A are both "0" and "output" 402B is "1" (i.e., PS 600 is conductive). When current flow 404A is zero and current flow 405A is a reset pulse, a single amorphous region is formed in PCM 202. This is demonstrated in NAND truth table 602 where "input" 404A is "0" (i.e., no current) and "input" 405A is "1" (i.e., a reset pule). In this situation, amorphous region 552 is formed adjacent to heater 205. If the pulses are reversed (i.e., "input" 404A is "1" and "input" 405A is "0"), amorphous region 552 would not form but would be replaced by an amorphous region PCM 202 adjacent to heater 204 (not shown in FIG. 6 but illustrated in FIG. 5A). In both instances, PS 600 remains conductive as shown in NAND truth table 602 (i.e., one of "input" 404A and "input" 405A is "0" while the other is "1" resulting in "output" 402B of "1" indicating that the PS is closed). Finally, when both current flow 404A and current flow 405A are reset pulses, amorphous region 552 is formed adjacent to heater 205 and another amorphous region is formed adjacent to heater 204 (not shown in FIG. 6 but illustrated in FIG. 5B). Because the two amorphous regions merge, PS 600 becomes non-conductive and the PS is open. This is shown in NAND truth table 602 where both "input" 404A and "input 405A are "1" with a corresponding "output" 402B of "0".

Figure 7A:
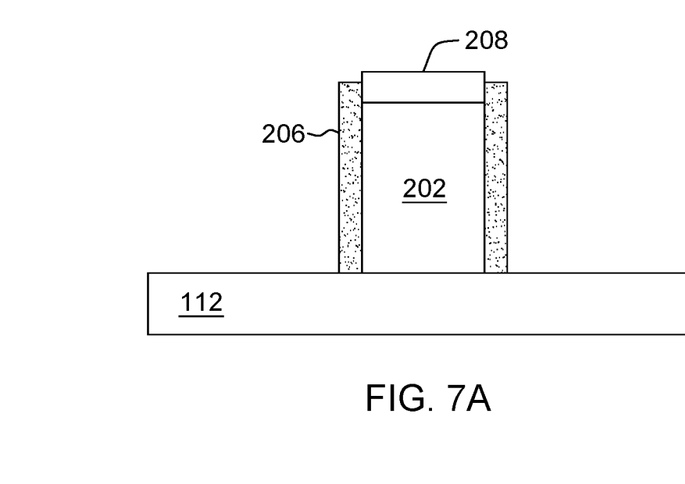
FIGS. 7A-7D depict a simplified process flow for manufacturing a PS, in accordance with an embodiment of the present invention.

FIG. 7A through FIG. 7D depict simplified views of the formation of a PS. In FIG. 7A, the phase change material (i.e., PCM 202) is deposited in a gap formed in an existing metal layer (i.e., M2 metal 112). Any excess of PCM 202 may be removed using photolithography and reactive ion etching (ME) leaving behind only PCM 202. An insulating material which is both a good thermal conductor and a poor electrical conductor is blanket deposited and spacer sidewall 206 is formed out of the insulating material using a reactive ion etching process. Note that hard mask 208 that was used to define PCM 202 remains on top of PCM 202.

Figure 7B:
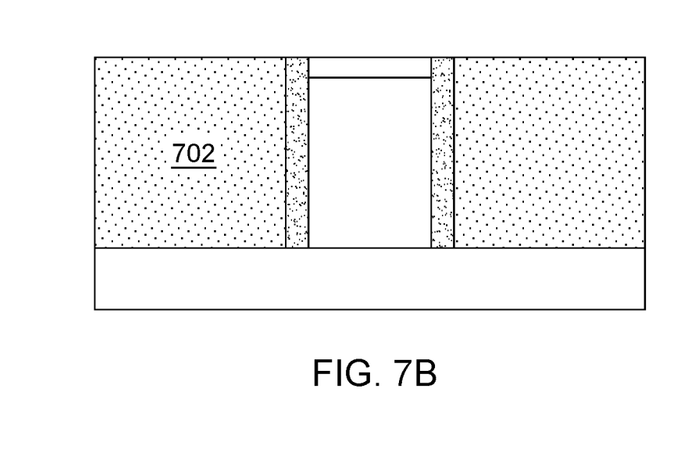

In FIG. 7B, dielectric 702 (equivalent to dielectric 116 in FIG. 1) is a material which is deposited over the PS structure. The top surface of dielectric 702 is planarized using a chemical-mechanical planarization (CMP) process which results in the top of dielectric 702 and the top of hard mask 208 being at the same plane.

Figure 7C:
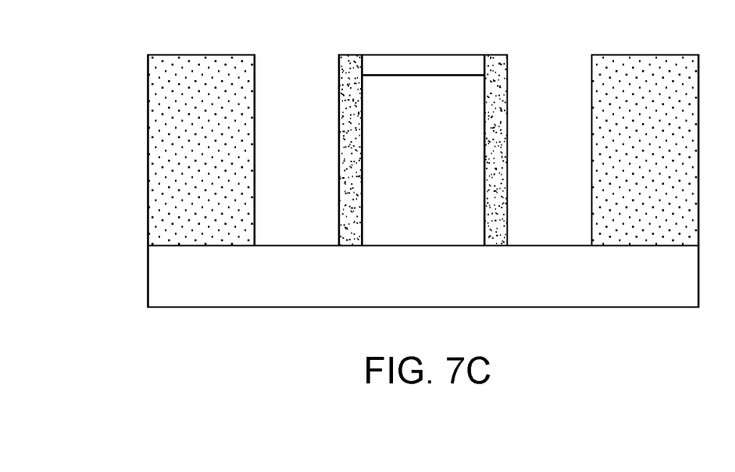

In FIG. 7C, trenches in dielectric 702 are created on either side of PCM 202 by an etching process. This is simply the removal of some of dielectric 702 adjacent to spacer sidewall 206.

Figure 7D:
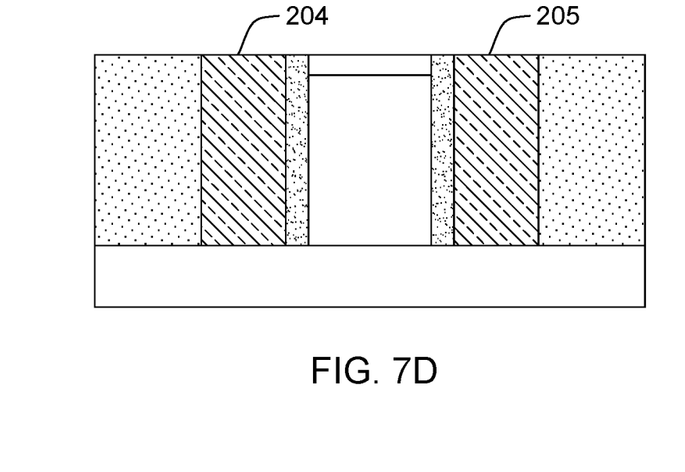

In FIG. 7D, heater 204 and heater 205 are formed by filling the previously created trenches with a resistive material such as tantalum nitride (TaN). The entire structure is again planarized using the CMP process resulting in all of the top surfaces of the features of the structure being on the same plane.

Figure 8:
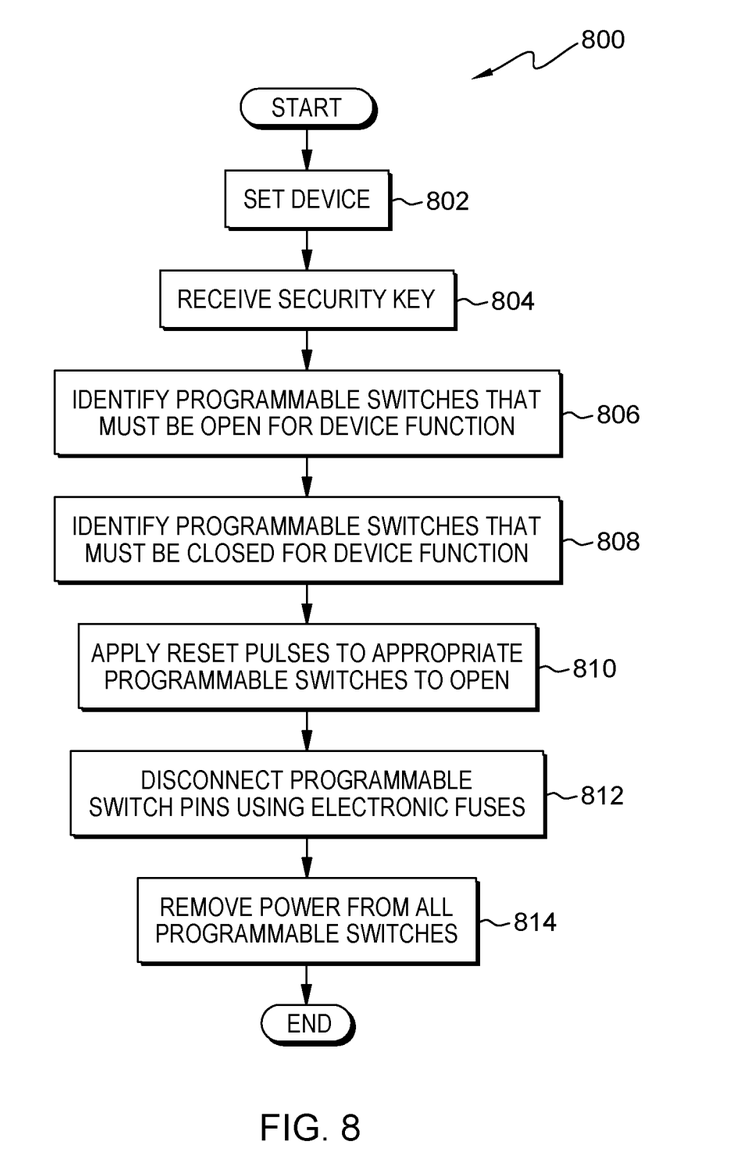
FIG. 8 depicts a flowchart for providing a security mechanism for computer chips using PS, in accordance with an embodiment of the present invention.

FIG. 8 is a flowchart of workflow 800 depicting a methodology for a user to "unlock" a computer chip that has been protected by any number of programmable switches. In an embodiment, workflow 800 is performed by a user who has access to the appropriate security key.

According to an embodiment, the user "sets" device in step 802. In other words, the user sets each of the programmable switches (PS) included in the computer chip (i.e., integrated circuit). In an embodiment, the actual programming of each PS on a chip, and there can be a large number of programmable switches, is generally done by separate circuitry on the chip. In some embodiments, said circuitry may include a state machine or a microcontroller that receives the security key from the user as is discussed below and sets the device via one or more computer processors. In an embodiment, the user sets each PS by using set pulses for each PS which causes the phase change material (PCM) in the PS to crystallize thus forming a conductive structure. In another embodiment, the user heats the entire chip to a temperature greater than the crystallization temperature of the PCM and allows the chip to cool to ambient room temperature; this process sets all of the PS making them conductive. After the device (i.e., computer chip) is set, all of the PS are conductive, but the chip is rendered non-functional. Further, programmable switches that have been "set" are considered to be "closed" because they are conductive and allow current to flow (analogous to a light switch which when "closed" (i.e., placed in the "on" position) turns on the light and when "open" (i.e., placed in the "off" position) turns off the light). For example, for a chip with three hundred PS, all three hundred are "set" to be closed.

In an embodiment, the user receives the security key in step 804. In other words, the user receives, or retrieves, the security key associated with the computer chip. According to an embodiment, the security key defines which PS should be "open" and which PS should be "closed" so that the chip functions correctly. The security key is provided by the chip designer who may also be the chip manufacturer. In the example, the security key states that for the device to function, a first set of the three hundred PS should remain "closed" while a second set of the three hundred PS should be "opened" (or made to be non-conductive).

According to an embodiment, in step 806 the user identifies the programmable switches that must be "open" for the device to function. In other words, the user identifies a list of PS from the security key that must be reset so that they are made non-conducting by changing the state of the PCM from crystalline to amorphous. The identification may be done by the user inputting the security key and the microcontroller will identify the various PS, and further, program the PS when needed. In the example, of the three hundred programmable switches (i.e., "1" through "300"), the PS associated with odd numbers must be "opened" (i.e., PS numbers "1", "3", "5", . . . "297", and "299").

In an embodiment, in step 808 the user identifies the programmable switches that must be "closed" for the device to function. In other words, the user identifies a list of PS from the security key that must be set so that they are made conductive by changing the state of the PCM from amorphous to crystalline. Here, because the device was "set" in an earlier step, no action is needed by the user regarding this list of PS that must be "set". In a situation where the initial status of each PS was unknown and the user did not perform the "set" device step, knowing which PS to "set" (i.e., close) would be important. In the example, of the three hundred programmable switches (i.e., "1" through "300"), the PS associated with even numbers must be "closed" (i.e., PS numbers "2", "4", "6", . . . "298", and "300"). Generally, the locations of the programmable switches would be completely random rather than "odd" and "even" as used in this example.

According to an embodiment, in step 810 reset pulses are applied to the appropriate programmable switches. In other words, responsive to identifying the set of PS that must be "open" for the device to function, the user applies reset pulses to each of said PS. In an embodiment, the reset pulse changes the state of the PCM from crystalline (and conductive) to amorphous (and non-conductive). Once completed, each of the PS are "open". In the example, reset pulses are applied to each of the odd numbered PS.

In an embodiment, in step 812 pins associated with each PS are disconnected using electronic fuses. In other words, each PS is electrically isolated from its associated input pins. According to an embodiment, the user provides an input current above a threshold value which causes the electronic fuses built into the wiring (i.e., circuitry) associated with each PS to "overload" thus creating an electrical open in the wiring. As a result of disconnecting the pins and the associated PS, individual PS can no longer be "set" or "reset" (i.e., "closed" or "opened"). The device is permanently set to function (assuming the PS were "open" or "closed" per the security key). According to another embodiment, the use of electronic fuses is optional (i.e., electronic fuses are not required to be included in the wiring associated with the PS), and the operation of the programmable switches are not affected by not including the electronic fuses. In the example, the user overloads each of the electronic fuses associated with each of the three hundred PS by inputting a current above a threshold value.

According to an embodiment, power is removed from all programmable switches in step 814. In other words, once all of the PS are set to "open" or "closed" per the security key, and the electronic fuses are opened for all of the PS (if so equipped), power is removed from the device as constant power is not needed for the PS to function (i.e., the PS will maintain its state until a set pulse, for a fully amorphous PCM, or a reset pulse, for a fully crystalline PCM, is applied).

Using the phase change material to implement the programmable switches provide several advantages. First, unless electronic fuses are opened, a PS can be opened and/or closed per the security key multiple times. For example, a chip manufacturer may produce a chip, electrically test it in-house, disable the chip, send it out for visual inspection by a non-trusted company, receive the chip back, enable the chip, electrically test it in-house again, disable the chip, send the chip out for identification marking to another non-trusted company, receive the chip back, enable the chip, and continue with the packaging of the chip into a module.

A second advantage with the PCM is that electrical probing of the chip is not required to disable the chip. Since probing can also cause unintended damage to the chip, being able to disable the chip by simply annealing the chip above the crystallization temperature of the PCM will cause all of the PS to crystallize and become conductive which disables the chip.

A third advantage of the PS is that it can be placed at any level of metal in the chip. FIG. 1 shows PS insertion at M3 metal 102, M2 metal 112, M1 metal 120, M3/M2 via 106, M2/M1 via 114, and M1/FET via 122. Further, the PS requires less chip "real estate" compared to the area required by the logic lock which requires additional logic circuits to be inserted between existing logic circuits.

A fourth advantage of the PS is that once it is set "open" or "closed", the PS will remain in that state without power. This is because the PS forms a nonvolatile memory (i.e., it does not require constant power to retain its memory). This differs from the current logic lock method which must be powered to properly function.

A fifth advantage of the PS is that based on the selection of the PCM, the duration in which a PS stays "open" can be controlled (i.e., the lifetime of the integrated circuit can be controlled). This duration is the mean time (i.e., operating time or lifetime) that the phase change material remains in the amorphous phase before transitioning (i.e., reverting) on its own (i.e., naturally) into the more stable crystalline phase. This retention time depends on the ambient temperature and the composition of the material (i.e., the specific PCM chosen for the application). This time can be tuned from at least ten years down to a few minutes. The ability to control the retention time allows a manufacturer to enable a chip to a specific usage period, after which the chip functionality is likely to fail.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described embodiments of a PCM based PS which allows a chip to be enabled and disabled, a process of manufacturing a PS, and a method for "unlocking" a chip that has been disabled (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. A method, the method comprising:
   receiving, by one or more computer processors, a security key associated with a plurality of programmable switches included in an integrated circuit, wherein the plurality of programmable switches each include a pair of heating elements;
   setting, by one or more computer processors, the plurality of programmable switches to be conductive by flowing a first reset current pulse through a first heater of the pair of heating elements to form a first amorphous region within a phase change material included in the plurality of programmable switches, wherein the first amorphous region has a first width which is less than a width of the phase change material;
   setting, by one or more computer processors, the plurality of programmable switches to be non-conductive by flowing a second reset current pulse through a second heater of the pair of heating elements to form a second amorphous region within the phase change material, wherein the second amorphous region overlaps the first amorphous region to block current flow through a crystalline portion of the phase change material;
   disconnecting the plurality of programmable switches via electronic fuses; and
   applying, by one or more computer processors, heat to the integrated circuit without engaging the pair of heating elements to disable the integrated circuit, wherein the integrated circuit is disabled without probing.

2. The method of claim 1, wherein the plurality of programmable switches comprise a set of nonvolatile logic devices.

3. The method of claim 1, wherein the step of setting, by one or more computer processors, the plurality of programmable switches causing the plurality of programmable switches to be conductive, comprises:
   heating, by one or more computer processors, the integrated circuit to a temperature greater than a crystallization temperature of a phase change material included in the plurality of programmable switches; and
   cooling, by one or more computer processors, the integrated circuit to ambient room temperature.

4. The method of claim 1, wherein setting the plurality of programmable switches included in the integrated circuit renders the integrated circuit non-functional.

5. The method of claim 1, wherein applying the reset pulses to the first set of programmable switches causes said programmable switches to open resulting in said programmable switches to become non-conductive.

6. The method of claim 1, wherein the security key:
   is comprised of the first set of programmable switches and a second set of programmable switches;
   defines the first set of programmable switches in the plurality of programmable switches which are required to be open for the integrated circuit to function; and
   further defines a second set of programmable switches in the plurality of programmable switches which are required to be closed for the integrated circuit to function.

7. The method of claim 1, further comprising:
   disconnecting, by one or more computer processors, pins associated with the plurality of programmable switches; and removing, by one or more computer processors, power from the plurality of programmable switches.

8. The method of claim 7, wherein the step of disconnecting, by one or more computer processors, pins associated with the plurality of programmable switches, comprises:
inputting, by one or more computer processors, a current above a threshold value causing electronic fuses associated with the plurality of programmable switches to overload resulting in electrical opens in wiring associated with the plurality of programmable switches.

9. The method of claim 1, wherein:
a lifetime of the integrated circuit can be controlled based on a selection of a phase change material comprising the plurality of programmable switches and an ambient temperature in which the integrated circuit will operate; and
the lifetime of the integrated circuit is an operating time of the integrated circuit before the phase change material will revert naturally from an amorphous state to a crystalline state.

10. A programmable switch, the programmable switch comprising:
a first electrode and a second electrode, wherein said first and second electrodes are separated by a phase change material in a first plane;
a first heater on a first side of the phase change material; and
a second heater on a second side of the phase change material, wherein (i) the first heater and the second heater oppose one another separated by the phase change material in a second plane which is orthogonal to the first plane, (ii) the programmable switch is conductive by flowing a first reset current pulse through the first heater to form a first amorphous region within the phase change material included in the programmable switch, wherein the first amorphous region has a first width which is less than a width of the phase change material, (iii) the programmable switch is non-conductive by flowing a second reset current pulse through the second heater to form a second amorphous region within the phase change material, wherein the second amorphous region overlaps the first amorphous region to block current flow through a crystalline portion of the phase change material, and (iv) heat is applied to an integrated circuit containing the programmable switch without engaging the pair of heating elements and the integrated circuit is disabled without probing.

11. The programmable switch of claim 10, wherein applying an electrical current to both the first heater and the second heater causes a change to a state of the phase change material.

12. The programmable switch of claim 11, wherein the applied electrical current is a reset pulse and the change to the state of the phase change material is from crystalline to amorphous.

13. The programmable switch of claim 10, wherein the applied electrical current is a set pulse and the change to the state of the phase change material is from amorphous to crystalline.

14. The programmable switch of claim 12, wherein the reset pulse:

is a current pulse that increases a temperature of the phase change material above its melting temperature followed by a first cooling which creates amorphous regions in the phase change material; and
is known as a melt-quench.

15. The programmable switch of claim 13, wherein the set pulse is a current pulse that increases a temperature of the phase change material above its crystallization temperature followed by a second cooling which creates a fully crystalline phase change material.

16. The programmable switch of claim 10, wherein applying a combination electrical current input to the first heater and the second heater changes a state of the phase change material such that a conductivity between the first electrode and the second electrode follows a NAND truth table.

17. A method, the method comprising:
forming a plurality of nonvolatile logic devices in line with vias and wires during a back end-of-line manufacturing process of a functional integrated circuit, each nonvolatile logic device in the plurality of nonvolatile logic devices comprising:
two electrodes separated by a phase change material; and
two heaters positioned on opposite sides of the phase change material;
forming a lock circuit electrically connected to the two heaters of the plurality of nonvolatile logic devices, wherein:
the lock circuit is electrically separate from back end-of-line wiring of a functional integrated circuit; and
applying an electrical current to each of the two heaters causes a change in a state of the phase change material, wherein (i) the phase change material is conductive by flowing a first reset current pulse through a first heater of the two heaters to form a first amorphous region within the phase change material included in the programmable switch, wherein the first amorphous region has a first width which is less than a width of the phase change material (ii) the phase change material is non-conductive by flowing a second reset current pulse through a second heater of the two heaters to form a second amorphous region within the phase change material, wherein the second amorphous region overlaps the first amorphous region to block current flow through a crystalline portion of the phase change material, and (iii) heat is applied to an integrated circuit containing the programmable switch without engaging the pair of heating elements and the integrated circuit is disabled without probing.

18. The method of claim 17, wherein:
the two electrodes and the wires are comprised of copper; and
the vias are comprised of tungsten.

19. The method of claim 17, wherein the phase change material is selected from the group consisting of germanium antimony telluride, germanium telluride, antimony telluride, and gallium antimony.

20. The method of claim 17, wherein the two heaters are:
resistive heaters which give off heat based on a current flow through each heater of the two heaters;
electrically isolated from the phase change material; and
thermally coupled to the phase change material.

* * * * *